United States Patent [19]

Hayama et al.

[11] Patent Number: 4,574,588

[45] Date of Patent: Mar. 11, 1986

[54] AUTOMOBILE EXHAUST PURIFYING SYSTEM

[75] Inventors: Nobuhiro Hayama, Hiroshima; Takeshi Yoshimura; Yoshitaka Tanikawa, both of Higashihiroshima, all of Japan

[73] Assignee: Mazda Motor Corporation, Hiroshima, Japan

[21] Appl. No.: 692,623

[22] Filed: Jan. 18, 1985

[30] Foreign Application Priority Data

Jan. 20, 1984 [JP] Japan ................................. 59-8944

[51] Int. Cl.$^4$ ............................................. F02B 75/10
[52] U.S. Cl. ........................................ 60/284; 60/285; 123/424
[58] Field of Search ................... 60/284, 285; 123/424

[56] References Cited

U.S. PATENT DOCUMENTS

| | | | |
|---|---|---|---|
| 3,793,833 | 2/1974 | Basshuysen | 60/284 |
| 3,813,877 | 6/1974 | Hunt | 60/284 |
| 3,984,976 | 10/1976 | Nagai | 60/285 |
| 4,442,812 | 4/1984 | Mizuno | 123/424 |
| 4,489,691 | 12/1984 | Ono | 123/424 |

Primary Examiner—Douglas Hart
Attorney, Agent, or Firm—Burns, Doane, Swecker & Mathis

[57] ABSTRACT

An exhaust purifying system for an automobile engine including an exhaust system for the emission of exhaust gases to the atmosphere through a catalytic converter. The system comprises a temperature detector for detecting a signal indicative of the temperature of the catalyst, a total engine operating hour detector for detecting a signal indicative of the total operating hour over which the engine has been operated, a spark timing control for retarding the spark timing when the temperature detector detects that the catalyst temperature is lower than a predetermined value, and a retard time corrector for increasing the amount of control to be performed by the spark timing control with increase within a predetermined range detected by the total engine operating hour detector.

5 Claims, 12 Drawing Figures

AUTOMOBILE EXHAUST PURIFYING SYSTEM

BACKGROUND OF THE INVENTION

The present invention generally relates to an automobile exhaust purifying system and, more particularly, to the control of the spark timing for eventually minimizing the emission of obnoxious components of the exhaust gases emitted by the automobile engine.

Since the exhaust gases emitted by the internal combustion engines contain obnoxious components such as, for example, carbon monoxide (CO), hydrocarbon (HC) and nitric oxides (NOx), improvement had been, and is currently being, made on the fuel suction system, the fuel supply system, the ignition system, the exhaust system and/or some other control systems of the engine for the purpose of minimizing the emission of the obnoxious exhaust gas components. Of these numerous efforts hitherto rendered for minimizing the emission of the obnoxious exhaust gas components, the use of a catalytic converter on the exhaust system of the engine is largely practised.

As is well known to those skilled in the art, the catalytic converter generally comprises a heat-resistant vessel containing a mass of particles or pellets of one or a mixture of catalytic materials including, for example, platinum, vanadium and manganese and is so designed as to remove, by combustion or adsorption, the obnoxious exhaust gas components during the passage of the exhaust gases therethrough. In practice, the catalyst in the catalytic converter must be heated to a predetermined temperature or higher in order for it to exhibit the maximized exhaust gas purifying efficiency.

In the limited environments of the automobile utilizing the catalytic converter, the catalyst in the catalytic converter must be heated to a required temperature or higher in a minimized period of time particularly after the cold start of the engine so that the time during which the catalyst fails to work efficiently because of the low temperature can be minimized. This preheating of the catalyst is generally known as a warm-up of the catalyst and depends on, *inter alia*, heat carried by the exhaust gases emerging from the engine. The higher the temperature of the exhaust gases, the readier the warm-up of the catalyst. For increasing the temperature of the exhaust gases with a view to facilitating the catalyst warm-up, some methods are currently employed, including the control of the spark-plug ignition timing such as disclosed in, for example, the Japanese Laid-open Utility Model Publication No. 57-18771, first published on Jan. 30, 1982.

According to the above mentioned publication, the control of the spark advance is interrupted temporarily during a particular period while the engine is being warmed up, to warm up the catalyst, whereby the spark advance is controlled in dependence on the temperature of the exhaust gases or the temperature inside the catalytic converter.

In general, it is well known that, when the spark-plug ignition timing, that is, the spark timing, is retarded, the temperature of the exhaust gases subsequently emerging from the engine can be increased. In the case of the spark timing control system disclosed in the above mentioned Japanese publication, however, the spark timing is retarded by suspending the control of the spark advance, thereby to produce the elevated temperature of the exhaust gases necessary to warm up the catalyst. This prior art system appears to be satisfactory so far as the warm-up of the catalyst is concerned and, however, it has failed to take the time-dependent characteristic of the catalyst into consideration as will now be discussed.

As is well known to those skilled in the art, the characteristics of the catalyst used in the catalytic converter for use in the automobile exhaust system deteriorate with increase of the operating time, i.e., the cumulative time during which the catalytic converter is actually utilized. This in turn results in the corresponding reduction in capability of the catalyst to substantially purify the automobile exhaust gases. The reduction in capability of the catalyst adversely affects the manner in which the temperature of the catalyst in the catalytic converter is increased. More specifically, referring to the graph shown in FIG. 1 of the accompanying drawings wherein the axis of abscissas represents the passage of time from the cold start of the automobile engine and the axis of ordinates represents the temperature of the catalyst used in the catalytic converter, the catalyst when fresh is heated incident to the operation of the engine in such a manner as shown by the solid line a whereas the same catalyst when having been used for a long time with the purifying capability consequently reduced exhibits the increase in temperature in such a manner as shown by the chain line b. As can readily understood from the graph of FIG. 1, when the catalyst becomes aged in the sense that the exhaust gas purifying capability has been reduced, not only the rate of increase of the temperature of the catalyst, but also the maximum temperature achieved by the aged catalyst for a given temperature of the exhaust gases are reduced as compared with those afforded by the same catalyst when it was fresh.

In view of the above, where the warm-up of the catalyst relies on the increased temperature of the exhaust gases resulting from the suspended control of the spark advance effected during the warm-up of the engine such as achieved in the previously mentioned prior art, there is a problem in that, although the catalyst works satisfactorily in substantially purifying the exhaust gases when it is relatively fresh, it will, when aged, exhibit the reduced purifying effect and require a relatively long time to pass before it attains the required temperature.

SUMMARY OF THE INVENTION

The present invention has been developed with a view to substantially eliminating the above discussed problem and has for its essential object to provide an improved exhaust purifying system for an automotive vehicle of a type utilizing a catalytic converter, in which system the warm-up of the catalytic converter is carried out by the utilization of the temperature of the exhaust gases which has been elevated by retarding the spark timing from the regular spark timing.

Another important object of the present invention is to provide an improved exhaust purifying system of the type referred to above, wherein the aging of the catalyst used in the catalytic converter would not substantially affect the efficient warm-up of the catalytic converter and the reduction of the purifying capability of the catalyst incident to the aging is, therefore, minimized.

In order to accomplish these objects of the present invention, the exhaust purifying system for an automobile internal combustion engine comprises, according to the present invention, a catalytic converter disposed on the exhaust system of the engine and containing a catalyst for substantially purifying obnoxious components of the exhaust gases emerging from the engine, a temperature sensing means for either directly or indirectly detecting the temperature within the catalytic converter, a counting means for counting the total operating hour during which the engine has been actually operated, a spark timing control means for retarding the spark timing when the temperature within the catalytic converter detected by the temperature sensing means is lower than a predetermined temperature, and a correcting means for increasing the extent to which the spark timing is retarded by the spark timing control means, with the increase, at least within a predetermined range, of the total operating hour of the engine counted by the counting means.

With the present invention so designed, the extent to which the spark timing is retarded during the warm-up of the catalytic converter varies with the increase of the total engine operating hour, that is, with the extent to which the catalyst used in the catalytic converter is aged. Accordingly, the temperature of the exhaust gases ready to pass through the catalytic converter prior to the emission to the atmosphere can be elevated with the extent to which the catalyst is aged, so that the purifying capability of the catalyst in the catalytic converter can advantageously be maintained at a substantially optimum value even though the aging of the catalyst progresses to a certain extent.

BRIEF DESCRIPTION OF THE DRAWINGS

These and other objects and features of the present invention will become clear from the following detailed description of the present invention taken in conjunction with preferred embodiments thereof with reference to the accompanying drawings, in which.

DETAILED DESCRIPTION OF THE EMBODIMENTS

Figure 1:
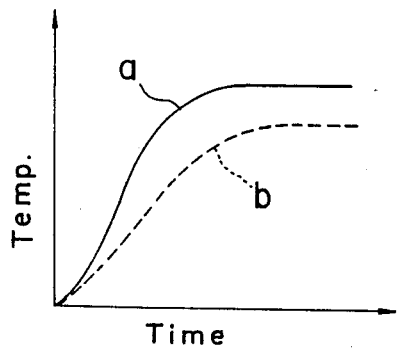
FIG. 1 is an explanatory graph used to explain the change in characteristic of the exhaust purifying catalyst with the passage of time.

Before the description of the embodiments of the present invention proceeds, it is to be noted that like parts are designated by like reference numerals throughout the accompanying drawings.

Figure 2:
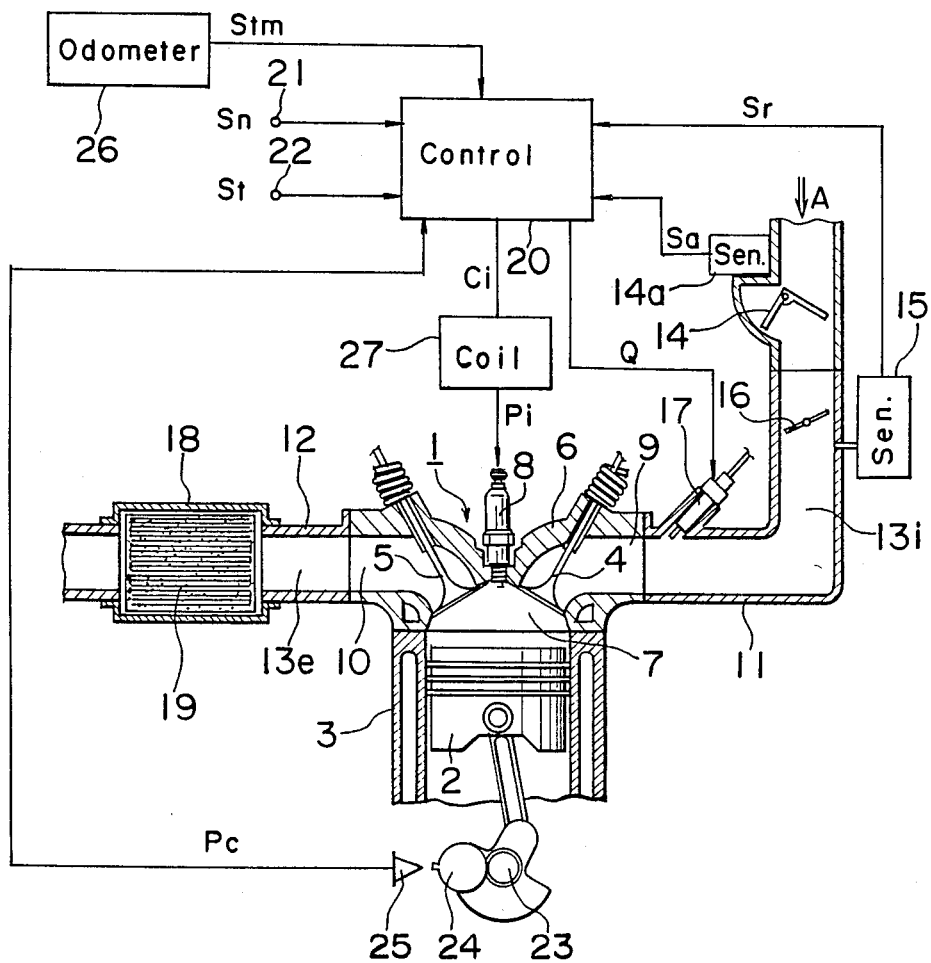
FIG. 2 is a diagram showing an exhaust purifying system according to a preferred embodiment of the present invention, which system is shown in combination with an automobile power plant.

Referring first to FIG. 2, the automobile power plant to which the present invention is applied comprises an internal combustion engine 1 comprising a cylinder block 3 having a cylindrical bore defined therein with a piston 2 slidably accommodated therein, and a cylinder head 6 having a recess defined therein and mounted on the cylinder block 3 so as to define a combustion chamber 7 within the cylindrical bore and between the piston 3 and the recess in cylinder head 6. The cylinder head 6 has a fuel intake port 9 and an exhaust port 10 defined therein in spaced relation thereto and in communication with the combustion chamber 7 and carries a fuel intake valve 4 and an exhaust valve 5 operatively positioned in the fuel intake port 9 and the exhaust port 10, respectively. A spark plug 8 having a spark gap is threadedly mounted on the cylinder head 6 with the spark gap positioned inside the combustion chamber 7.

The fuel intake port 9 has a fuel intake manifold 11 fluid-connected thereto whereas the exhaust port 10 has an exhaust manifold 12 fluid-connected thereto. The fuel intake manifold 11 has a suction passage 13$i$ defined therein for the passage of air, drawn from the atmosphere through an air cleaner (not shown) as shown by the arrow A, towards the combustion chamber 7 through the fuel intake port 9. The fuel intake manifold 11 is provided with an air flowmeter 14 installed thereon for measuring the flow of the air through the suction passage 13$i$, which air flowmeter 14 has an output unit 14$a$ electromechanically coupled therewith for generating an electric signal indicative of the flow of the air measured thereby. This fuel intake manifold 11 is also provided with a pressure sensor 15 for detecting the load imposed on the engine 1 in terms of the negative pressure developed inside the suction passage 13$i$ at a location downstream of a throttle valve 16 with respect to the direction of flow of the air towards the combustion chamber 7, and a fuel injector 17 for injecting a fuel into the suction passage 13$i$ so as to mix with the incoming air to form a combustible air-fuel mixture that is subsequently burned within the combustion chamber 7.

On the other hand, the exhaust manifold 12 has an exhaust passage 13$e$ defined therein for the passage of exhaust gases, which emerge from the combustion chamber 7 through the exhaust port 10 subsequent to the combustion of the combustible mixture within the combustion chamber 7, to the atmosphere and is provided with a catalytic converter 18 installed thereon for substantially purifying the exhaust gases prior to the emission thereof to the atmosphere, it being to be noted that the catalytic converter 18 has a catalyst 19 disposed on the exhaust passage 13$e$.

The automobile power plant also comprises a control unit 20 for controlling the operation of the spark plug 8 and the fuel injector 17 in a manner as will be described subsequently. An electric circuit between the control unit 20 and the spark plug 8 includes any known ignition coil 27 having a primary winding, adapted to be fed with a primary current Ci from the control unit 20, and a secondary winding electrically connected with the spark plug 8 and adapted to generate, during the interruption of the primary current Ci, a high voltage pulse Pi which is in turn applied to the spark plug 8 to cause the latter to generate a spark for igniting the combustible mixture within the combustion chamber 7.

The fuel injector 17 is employed in the form of, for example, an electromagnetically controlled fuel injecting valve and is adapted to receive an injection control pulse Q fed from the control unit 20. The fuel injector 17 injects fuel into the suction passage 13i for a period of time determined by the duration of the injection control pulse Q.

The control unit 20 is adapted to receive an air flow signal Sa indicative of the flow of the air through the suction passage 13i, which signal Sa is generated from the output unit 14a associated with the air flowmeter 14 as hereinbefore described, and a load signal Sr generated from the pressure sensor 15 indicating the load on the engine 1. This control unit 20 is also adapted to receive a cranking pulse Pc fed from a reference signal generator 25, a distance signal Stm indicative of the total running distance over which the automobile utilizing the system of the present invention has been driven, an engine speed signal Sn indicative of the engine speed which is fed through an input terminal 21 from an engine speed detector (not shown), and a start signal St indicative of the start of operation of the engine which is fed through an input terminal 22 from an automobile ignition switch.

The reference signal generator 25 capable of providing the cranking pulse Pc is operatively associated with a rotor 24 rotatable together with a cranking shaft 23 and generates the cranking pulse Pc indicative of the cranking angle at a predetermined timing before the piston 2 reaches the top dead center. On the other hand, the distance signal Stm is generated by an integrating odometer 26 operable to count the total distance over which the automobile has been driven.

Figure 3:
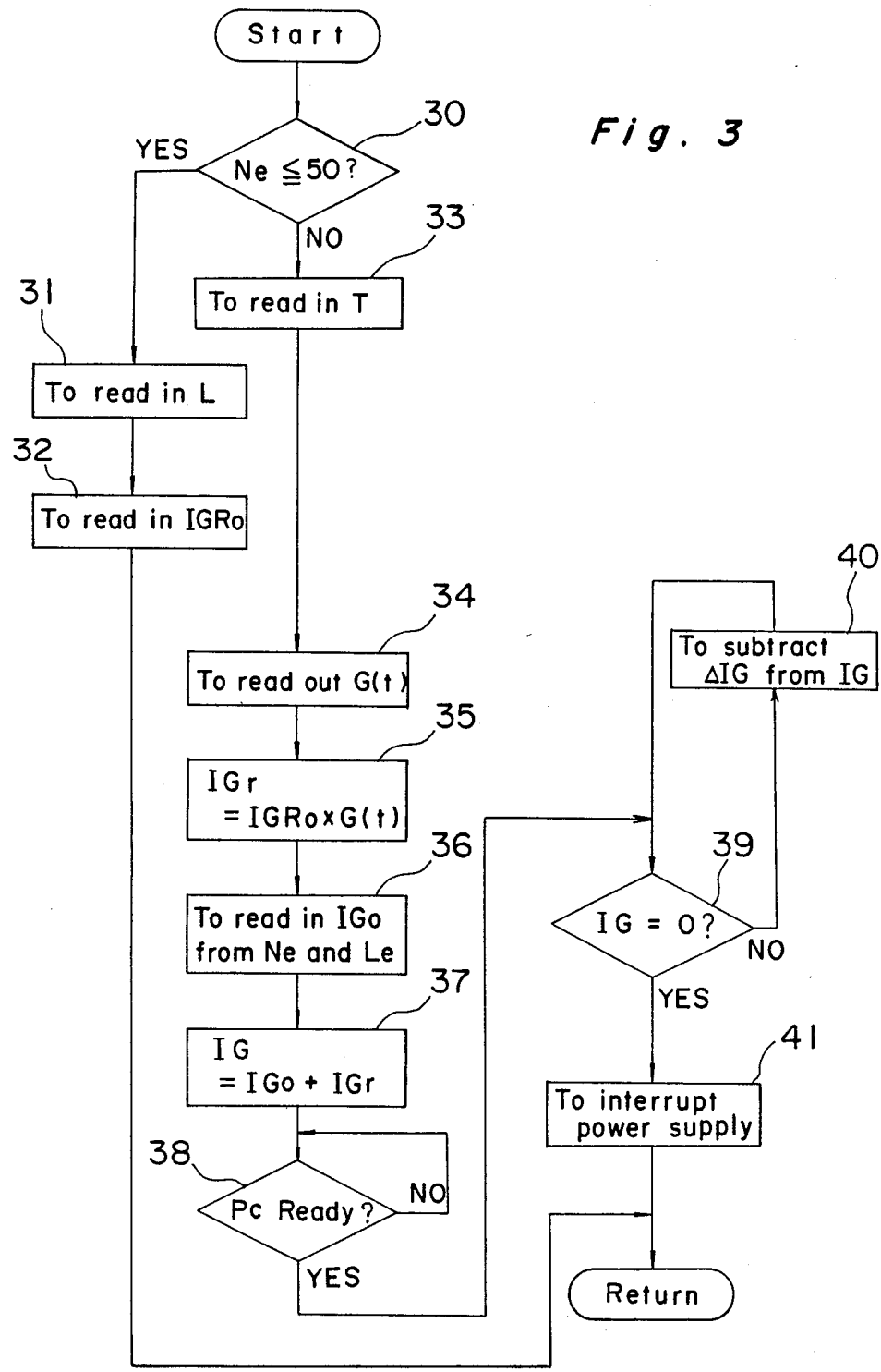
FIG. 3 is a flow chart showing the sequence of operation of a microcomputer used in a control unit shown in FIG. 2 to control the operation of the system of FIG. 2.

The control unit 20 is operable to process these input signals Sa, Sr, Stm, Sn, St and Pc to form the injection control pulse Q to be applied to the fuel injector 17 and as to control the supply of the primary current Ci to the ignition coil 27 in such a manner as will be described with particular reference to the flow chart of FIG. 3

In the construction so far described, at the time of the cold-start of the engine 1, the catalytic converter 18 is cooled with the temperature of the catalyst being lower than the operating temperature of the catalyst, that is, the temperature required for the catalyst to exhibit an effective purifying capability. Accordingly, as the engine 1 so cold-started is warmed up, the catalyst is also warmed up. At this time, the control unit 20 supplies the injection control pulse Q of a duration or pulse width, determined by the contents derived by the air flow signal Sa, the pressure signal Sr, the engine speed signal Sn and others, to the fuel injector 17 to cause the latter to inject the fuel into the combustion chamber 7 and, at the same time, controls the timing, at which the supply of the primary current Ci to the primary winding of the ignition coil 27 during each cycle of operation of the engine 1 is interrupted, thereby to retard the spark timing. This control to retard the spark timing is carried out by the time the temperature of the catalyst 19 in the catalytic converter 18 attains the operating temperature. However, since in the case of the cold-start of the engine the temperature of the catalyst 19 increases with the passage of time from the cold-start of the engine 1, the temperature of the catalyst 19 is, in this case, detected in terms of the time T that has passed subsequent to the generation of the start signal St indicative of the start of operation of the engine 1. Therefore, the control to retard the spark timing is performed by the time the operating time T attains a value corresponding to the operating temperature of the catalyst 19, for the purpose of facilitating the warm-up of the catalyst 19, and as the catalyst 19 is aged, the extent to which the spark timing is retarded is increased. This extent to which the spark timing is retarded is expressed in terms of a retard time that has passed from the generation of the cranking pulse Pc from the reference signal generator 25 to the control unit 20. Accordingly, the control unit 20 operates during each cycle of operation of the engine 1 to interrupt the supply of the primary current Ci to the primary winding of the ignition coil 27 at the time the retard time has passed subsequent to the generation of the cranking pulse Pc, thereby retarding the spark timing.

The reduction in performance of the catalyst 19 as a result of the aging progresses with the increase of the total operating hour of the engine 1 and, therefore, the extent to which the catalyst 19 is aged can be detected in terms of the total operating hour of the engine 1. The increase of the total operating hour of the engine 1 is in turn accompanied by a corresponding increase of the total running distance L over which the automobile has been driven and, therefore, in the instance now under discussion, the distance signal Stm generated from the odometer 26 is supplied to the control unit 20 as a parameter indicative of the total operating hour of the engine 1. Accordingly, the retard time for which the spark timing is retarded for the purpose of facilitating the warm-up of the catalyst 19 is increased by the control unit 20 with the increase of the total running distance L.

When the retard time for which the spark timing is retarded is increased in the manner as hereinabove described, the temperature of the exhaust gases within the exhaust passage 13e is correspondingly increased and, accordingly, the temperature of the exhaust gases to be introduced in the catalytic converter 18 during the warm-up of the catalyst 19 is increased with the progress of the aging of the catalyst 19. Therefore, even though the aging of the catalyst 19 progresses with the passage of time, the warm-up of the catalyst 19 can effectively be facilitated and, as a result, within a short time subsequent to the start of the engine 1, the substantial purification of the exhaust gases can be properly carried out in the catalytic converter 18. It is, however, to be noted that, in the event that the catalyst 19 is considerably aged, the increase of the temperature of the exhaust gases over a certain value will not bring about the increase of the temperature of the catalyst 19, and the increase of the retard time with the increase of the total running distance L takes place before the total running distance L attains a value corresponding to the considerable aging of the catalyst 19. The retard time will no longer be increased when and after the total running distance L has exceeded the predetermined value.

The control unit 20 operable in the manner as hereinabove described is constituted by the use of, for example, a microcomputer, and the program executed in this case by a central processing unit (CPU) of the microcomputer to effect the control to retard the spark timing will now be described with particular reference to the flow chart shown in FIG. 3.

Figure 4:
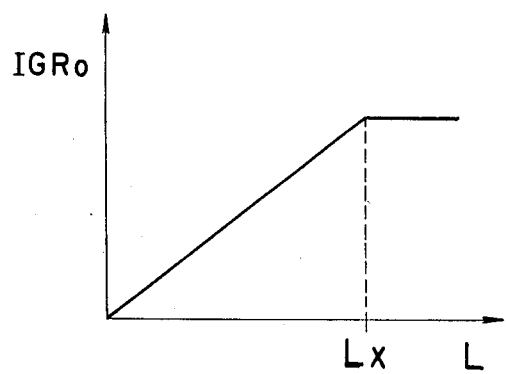
FIGS. 4 to 6 are graphs showing characteristic curves used for the purpose of the better understanding of the flow chart of FIG. 3.

After the start, a decision is made at the step 30 to determine if the engine speed Ne represented by the engine speed signal Sn is lower than a predetermined value, for example, 400 rpm. In case of the engine speed Ne lower than the predetermined value of 400 rpm, it means that the automobile having the power plant embodying the present invention is not running and, accordingly, the total running distance L is read in at the step 31 on the basis of the distance signal Stm fed from the odometer 26. Then, the program proceeds to the step 31 at which the total running distance L read in at the previous step 31 is checked against a data table so designed as to represent such a predetermined relationship that, for example, as shown in FIG. 4, the basic additive retard time IGRo increases with the increase of the total running distance L if the total running distance L is within a range smaller than a predetermined value Lx, for example, 80,000 km, but if the total running distance L is equal to or greater than the predetermined value Lx, the basic additive retard time IGRo takes a predetermined value, and the basic additive retard time IGRo appropriate to the total running distance L actually measured is subsequently read in. The basic additive retard time IGRo read in at this time is the one that increases with the increase of the total running distance L within the predetermined range smaller than the predetermined value Lx, that is, the one that increases with the increase of the total operating hour of the engine 1 to a value smaller than a predetermined value. The program returns to the start after the step 32.

Figure 5:
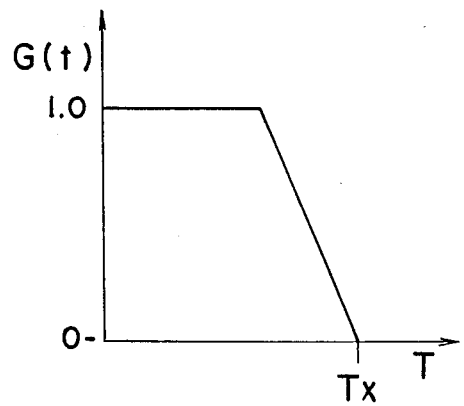

On the other hand, if the decision at the step 30 indicates that the engine speed Ne is equal to or higher than the predetermined value of 400 rpm, it means that the spark timing is to be retarded for the purpose of facilitating the warm-up of the catalyst in the catalytic converter and, therefore, at the step 33, the total operating hour T counted from the time the start signal St has arrived, that is, counted subsequent to the start of the engine 1, is read in. At the subsequent step 34, the total operating hour T read in at the previous step 33 is checked against a data table so designed as to represent such a predetermined relationship that, for example, as shown in FIG. 5, a retard time correction coefficient G(t) varies from 1.0 to 0 before the total operating hour T attains a predetermined value Tx, but takes a zero value when the total operating hour T is equal to or greater than the predetermined value Tx, and the correction coefficient G(t) appropriate to the total operating hour T actually counted is subsequently read out. The predetermined operating hour Tx is so selected to be equal to the time required for the temperature of the catalyst 19 in the catalytic converter 18 to attain the operating temperature, that is, the time during which the catalyst 19 is warmed up. Thereafter, at the step 35, the basic additive retard time IGRo read in at the step 32 is multiplied by the retard time correction coefficient G(t), read out at the step 34, to produce the additive retard time IGr. The additive retard time IGr becomes zero after the passage of the predetermined engine operating hour Tx subsequent to the start of the engine 1, and, up until the passage of the predetermined engine operating hour Tx subsequent to the start of the engine, the greater the total running distance L is before it attains the predetermined value Lx, that is, the greater the total engine operating hour is within the predetermined range, the greater the value the additive retard time IGr takes.

Figure 6:
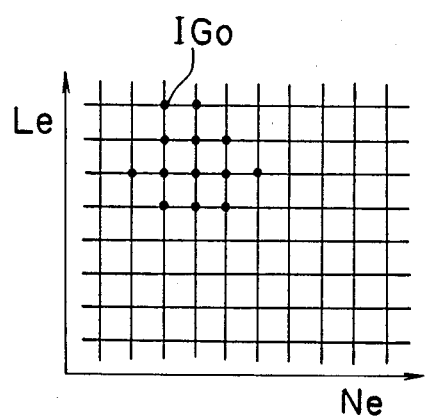

Thereafter and at the step 36, the engine speed Ne and the engine load Le represented by the load signal Sr generated from the pressure sensor 15 are checked against a map such as shown in FIG. 6, which map illustrates the basic retard time IGo determined by the engine speed Ne and the engine load Le, and the basic retard time IGo appropriate to the engine speed Ne and the engine load Le is read in. This basic retard time IGo is so made as to determine the regular spark timing. At the subsequent step 37, the basic retard time IGo read in at the step 36 is added with the additive retard time IRr calculated at the step 35, thereby to produce the final retard time IG.

After the determination of the final retard time IG, a decision is made at the step 38 to determine if the cranking pulse Pc from the reference signal generator 25 has arrived. If the cranking pulse Pc is determined as having not arrived yet, the step 38 is repeated until the cranking pulse Pc arrives. However, if the cranking pulse Pc is determined at the step 38 as having arrived, the program proceeds to the subsequent decision step 39 at which the decision is made to determine if the final retard time IG obtained at the step 37 is zero. Unless the final retard time IG is found at the step 39 to be zero, the step 40 takes place to subtract IG from the final retard time IG, followed by the return to the decision step 39. This process loop from the decision step 39 back to the decision step 39 through the step 40 is repeated so long as the final retard time IG is not zero. It is to be noted that IG represents a time equal to the time required to perform the process loop from the step 40 back to the step 40 through the decision step 39.

When the final retard time IG is determined at the step 39 as zero, that is, when the final retard time IG has passed subsequent to the arrival of the cranking pulse Pc, the step 39 is followed by the step 41 at which the supply of the primary current Ci which has been effected to the primary winding of the ignition coil 27 is interrupted, with the program returning to the start. Because of the interruption of the supply of the primary current Ci to the ignition coil 27, the high voltage pulse Pi is generated from the secondary winding of the ignition coil 27, which high voltage pulse Pi is supplied to the spark plug 8 to ignite the combustible mixture within the combustion chamber 7.

In this way, the spark timing is controlled so that the combustible mixture within the combustion chamber 7 can be ignited at the timing subsequent to the passage of the final retard time IG after the generation of the cranking pulse Pc. The final retard time IG is greater than the basic retard time IGo because the additive retard time IGr is not zero during the period in which the engine operating hour T subsequent to the start of the engine increases to the predetermined value Tx, that is, during the warm-up of the catalyst, and, therefore, during the warm-up of the catalyst, the spark timing is retarded relative to the regular spark timing thereby achieving the control to retard the spark timing for the purpose of increasing the temperature of the exhaust gases. Moreover, the greater the total engine operating hour is within the predetermined range, that is, the greater the extent to which the catalyst 19 in the catalytic converter 18 is aged, the greater the additive retard time IGr is during the warm-up of the catalyst 19. Therefore, the extent to which the spark timing is retarded during the warm-up of the catalyst can be increased with the progress of the aging of the catalyst in the catalytic converter and, consequently, the temperature of the exhaust gases during the warm-up of the catalyst can be increased with the progress of the aging of the catalyst 19 so that, even through the catalyst 19 is aged, the warm-up of the catalyst can be effectively performed.

Figure 7:
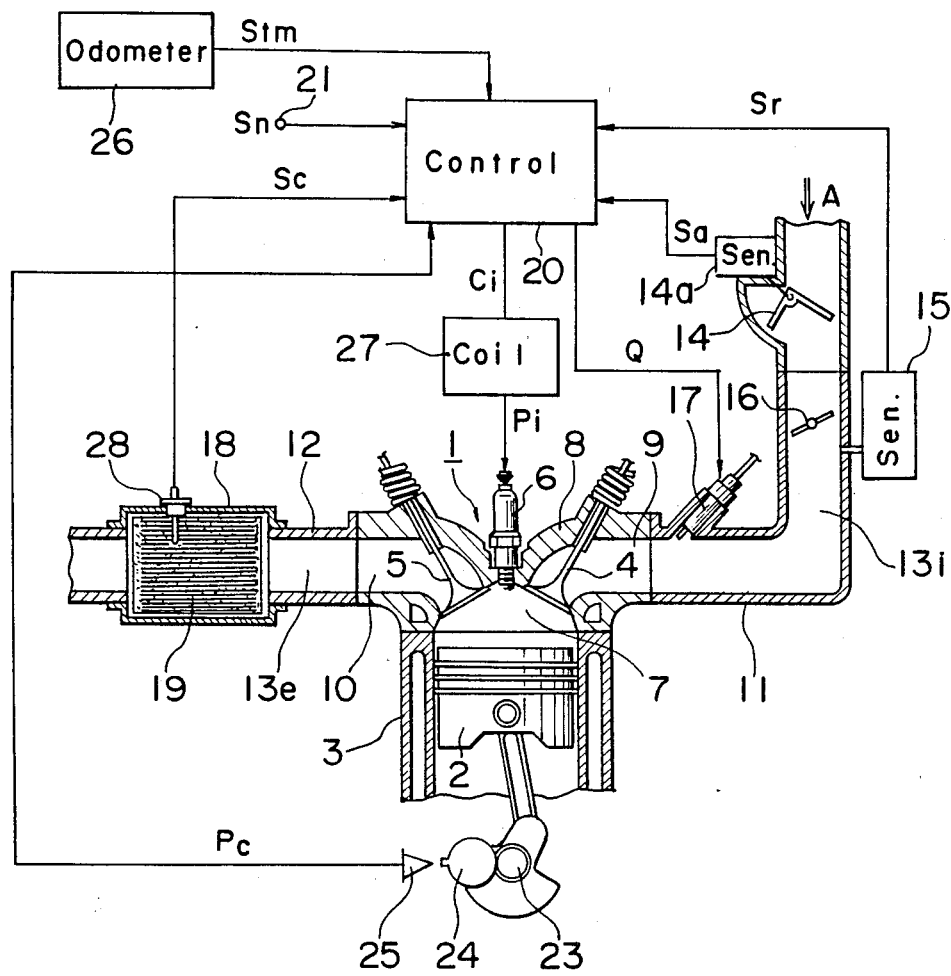
FIG. 7 is a view similar to FIG. 2, showing another preferred embodiment of the present invention.

In the embodiment shown in FIG. 7, in place of the start signal St which has been described as employed in the foregoing embodiment of FIG. 2, a temperature signal Sc indicative of the temperature of the catalyst 19 in the catalytic converter is employed and fed to the control unit 20. For this purpose, a temperature sensor 28 is mounted on the catalytic converter 18 so as to detect, and generate the temperature signal Sc indicative of, the temperature of the catalyst 19 in the catalytic converter 18. As is the case with the foregoing embodiment, even in this embodiment of FIG. 7 the control to retard the spark timing for the purpose of facilitating the warm-up of the catalyst 19 is carried out until the temperature C of the catalyst 19 detected by the temperature sensor 28 attains the operating temperature.

Figure 9:
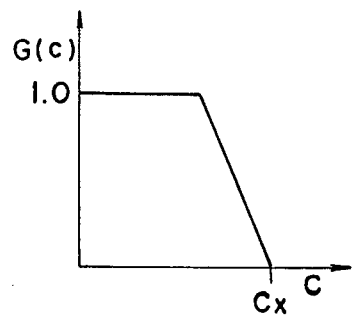
FIG. 9 is a graph showing a characteristic curve used for the purpose of the better understanding of the flow chart of FIG. 8.
Figure 8:
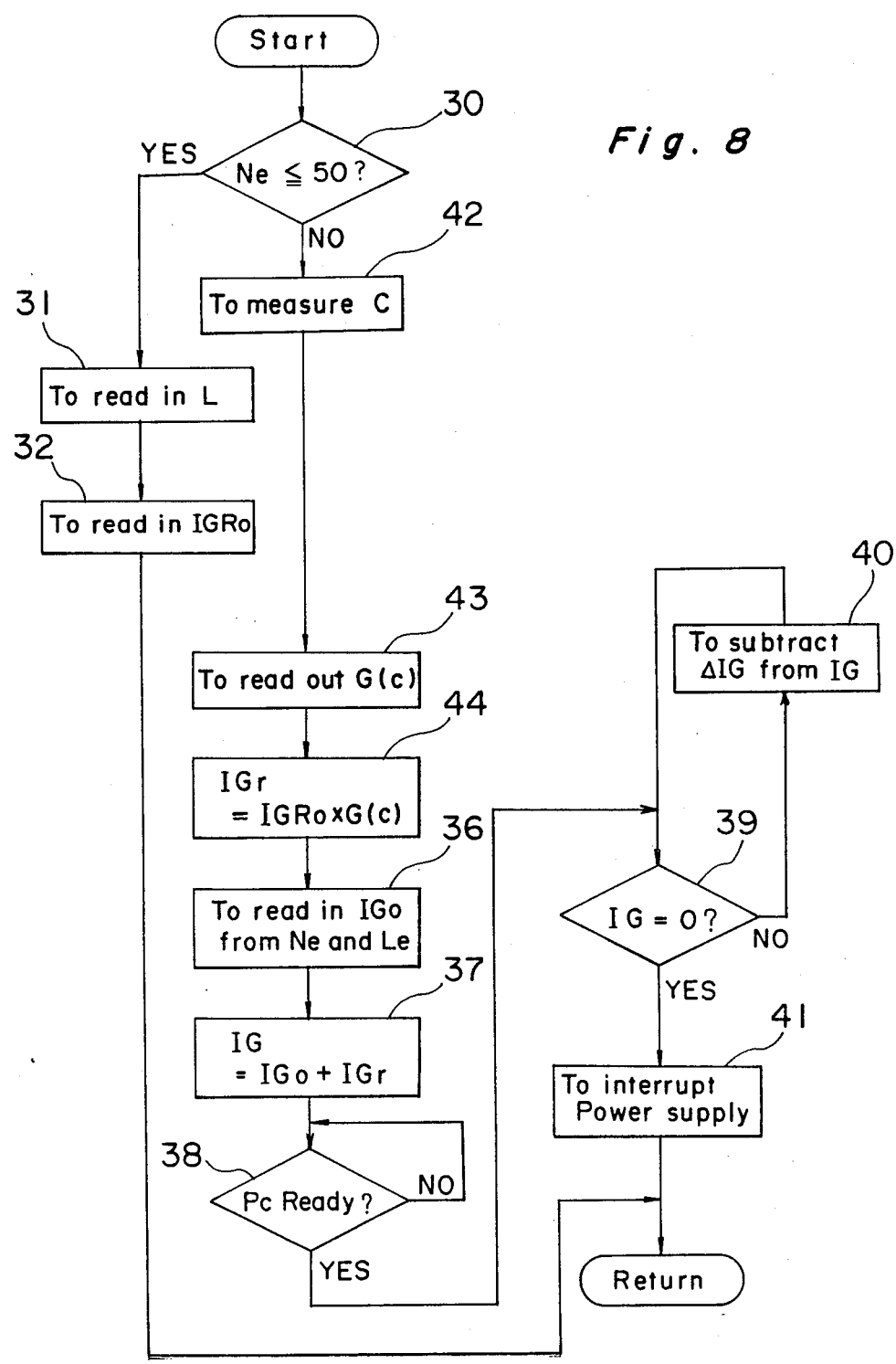
FIG. 8 is a flow chart showing the sequence of operation of the microcomputer used in the control unit shown in FIG. 7.

The sequence of control performed by the microcomputer in the control unit 20 in the embodiment shown in FIG. 7 is illustrated in FIG. 8. As can readily be understood from the comparison of the flow chart of FIG. 8 with the flow chart of FIG. 3, the difference resides in that the successive steps 33 to 35 shown in FIG. 3 are replaced by the successive steps 42 to 44, respectively. More specifically, in the flow chart shown in FIG. 8, when the engine speed Ne is determined at the decision step 30 to be equal to or higher than the predetermined value, that is, 400 rpm, that is, when the condition is established that the control to retard the spark timing for the purpose of facilitating the warm-up of the catalyst is to be carried out, the decision step 30 is followed by the step 42 at which the temperature C of the catalyst 19 is measured on the basis of the temperature signal Sc fed from the temperature sensor 28. At the subsequent step 43, the temperature C measured at the previous step 42 is checked against a data table so designed as to represent such a predetermined relationship that, for example, as shown in FIG. 9, the retard time correction coefficient G(c) varies from 1.0 to 0 before the temperature C of the catalyst 19 attains the operating temperature Cx, but takes a zero value when the temperature C of the catalyst 19 becomes equal to or higher than the operating temperature Cx, and the correction coefficient G(c) appropriate to the temperature C of the catalyst 19 actually measured is read out. The step 43 is followed by the stem 44 at which the basic additive retard time IGRo read in at the step 32 is multiplied by the retard time correction coefficient G(c), read out at the step 43, to produce the additive regard time IGr. This additive retard time IGr becomes zero after the temperature C of the catalyst 19 has attained the operating temperature Cx, but before the temperature C of the catalyst 19 attains the operating temperature Cx, that is, during the warm-up of the catalyst, the greater the total running distance L is before it attains the predetermined value Lx, that is, the greater the total engine operating hour is within the predetermined range, the greater the value the additive retard time IGr takes. Thereafter, the program proceeds to the step 36 which has been previously been described with reference to FIG. 3 and, therefore, it is clear that after the passage of the final retard time IG subsequent to the generation of the cranking pulse Pc, the spark plug is fired to ignite the combustible mixture within the combustion chamber 7 as hereinbefore described.

The embodiment of the present invention described with reference to and shown in FIGS. 7 to 9 functions, in a manner similar to, and, therefore, brings about effects similar to, that described with reference to and shown in FIGS. 2 to 6. However, since the temperature of the catalyst 19 is directly detected by the temperature sensor 28 in the embodiment of FIGS. 7 to 9, there is an additional advantage in that the detection of the warm-up of the catalyst can readily and accurately be carried out.

Figure 10:
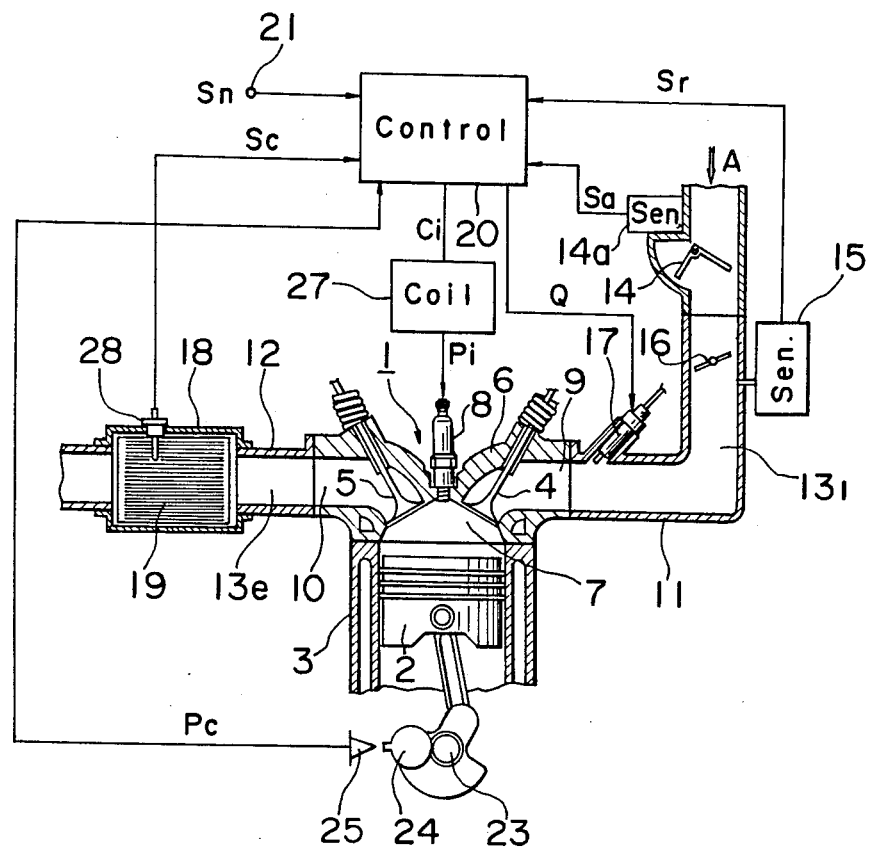
FIG. 10 is a view similar to FIG. 2, showing a further preferred embodiment of the present invention.
Figure 12:
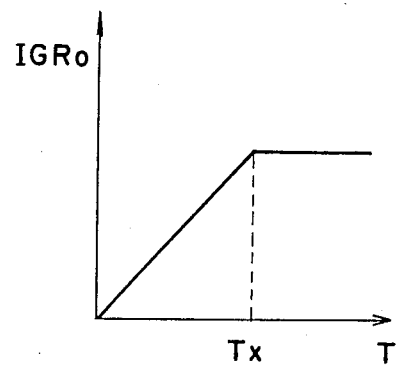
FIG. 12 is a graph showing a characteristic curve used for the purpose of the better understanding of the flow chart of FIG. 11.
Figure 11:
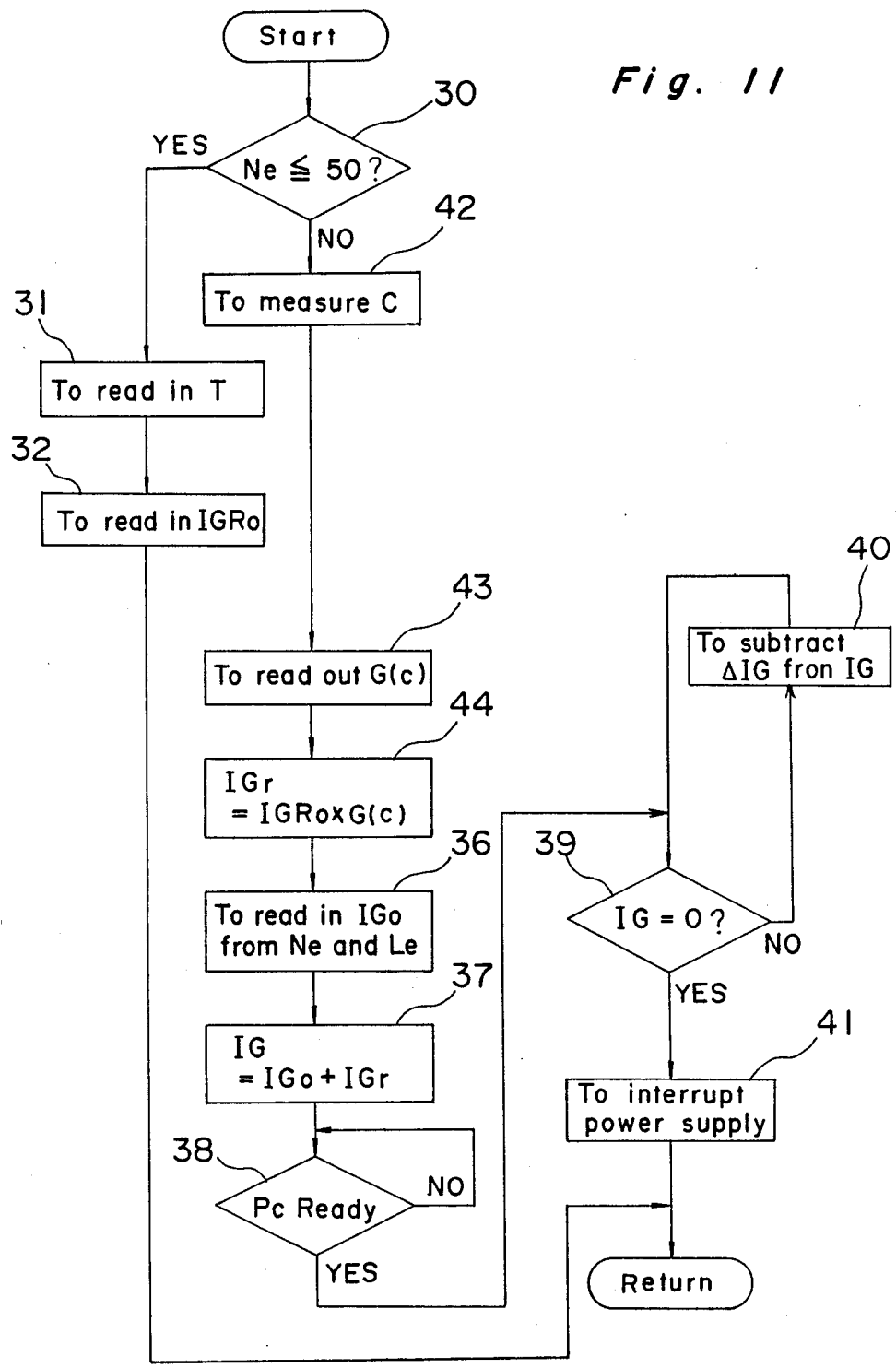
FIG. 11 is a flow chart showing the sequence of operation of the microcomputer used in the control unit shown in FIG. 10.

The embodiment of the present invention shown in FIGS. 10 to 12 is similar to that described with reference to and shown in FIGS. 7 to 10 except that, in the embodiment shown in FIGS. 10 to 12, the odometer 26 shown in FIG. 7 is not connected to the control unit 20 and, instead, the step 31 shown in FIG. 11 is used to read in the total engine operating hour T. This is because the aging of the catalyst 19 in the catalytic converter 18 is corelated with the increase of the total operating hour T of the engine 1 as hereinbefore discussed in connection with the first preferred embodiment of the present invention.

From the foregoing description, it has now become clear that, with the exhaust purifying system according to the present invention, the extent to which the regular spark timing is retarded during the warm-up of the catalyst can advantageously be increased with the progress of aging of the catalyst so that the temperature of the exhaust gases produced during the warm-up of the catalyst can be correspondingly increased with the aging of the catalyst. Therefore, even if the catalyst is aged to some extent, the catalyst in the catalytic converter can be effectively warmed up with the reduction of the purifying capability minimized for the purpose of enabling the catalyst in the catalytic converter to start in a short time subsequent to the engine start its function to minimize the emission of the obnoxious components of the exhaust gases. This brings about an additional advantage in that the reduction in mileage can be minimized.

Although the present invention has fully been described in connection with the preferred embodiments thereof with reference to the accompanying drawings, it is to be noted that various changes and modifications are apparent to those skilled in the art. By way of example, although in each of the foregoing embodiments of the present invention, the increase of the retard time with increase of the total running distance L of the automobile has been described as taking place before the total running distance attains the predetermined value Lx which corresponding to the extent to which the catalyst has been aged considerably, this limitation is not always essential in the practice of the present invention.

Accordingly, such changes and modifications are to be understood as included within the true scope of the present invention as defined by the appended claims, unless they depart therefrom.

We claim:

1. An exhaust purifying system for an automobile internal combustion engine which comprises, in combination:
a catalytic converter disposed on an exhaust system of the engine and having a catalyst;
a temperature detecting means for detecting a signal indicative of the temperature of the catalyst;

a total engine operating hour detecting means for detecting a signal indicative of the total operating hour over which the engine has been operated;

a spark timing control means for controlling the spark timing to retard when said temperature detecting means detects that the temperature of the catalyst is lower than a predetermined value;

a retard time correcting means for increasing the amount of control performed by the spark timing control means with increase within a predetermined range detected by said total engine operating hour detecting means.

2. A system as claimed in claim 1, wherein said total engine operating hour detecting means comprises an integrating odometer for detecting the total running distance of the automobile driven by the internal combustion engine.

3. A system as claimed in claim 1, wherein said temperature detecting means comprises a catalyst temperature sensor.

4. A system as claimed in claim 1, wherein said temperature detecting means includes a start detecting means for detecting the passage of a predetermined time subsequent to the start of the engine.

5. A system as claimed in claim 1, wherein said total engine operating hour detecting means comprises an integrating counter for counting the total engine operating hours.

* * * * *